(12) United States Patent
Fout et al.

(10) Patent No.: US 7,736,497 B2
(45) Date of Patent: Jun. 15, 2010

(54) DEWATERING SYSTEM

(75) Inventors: Gary E. Fout, Cypress, TX (US); Julio Roberto Ronderos, Houston, TX (US); Catalin Ivan, Houston, TX (US)

(73) Assignee: M-I L.L.C., Houston, TX (US)

( * ) Notice: Subject to any disclaimer, the term of this patent is extended or adjusted under 35 U.S.C. 154(b) by 459 days.

(21) Appl. No.: 11/461,969

(22) Filed: Aug. 2, 2006

(65) Prior Publication Data

US 2008/0029458 A1 Feb. 7, 2008

(51) Int. Cl.
*C02F 1/56* (2006.01)

(52) U.S. Cl. .................. 210/143; 175/206; 210/199; 210/206; 210/241; 422/901

(58) Field of Classification Search ............. 210/192
See application file for complete search history.

(56) References Cited

U.S. PATENT DOCUMENTS

| | | | | |
|---|---|---|---|---|
| 2,378,323 | A * | 6/1945 | Pomeroy | 516/140 |
| 3,853,616 | A * | 12/1974 | Rundell et al. | 127/48 |
| 4,210,166 | A * | 7/1980 | Munie | 137/271 |
| 4,470,907 | A * | 9/1984 | Sencza | 210/192 |
| 4,518,261 | A * | 5/1985 | Sekimoto et al. | 366/155.1 |
| 4,710,304 | A * | 12/1987 | Lang | 210/734 |
| 4,830,757 | A * | 5/1989 | Lynch et al. | 210/742 |
| 4,855,061 | A * | 8/1989 | Martin | 210/709 |
| 5,145,256 | A * | 9/1992 | Wiemers et al. | 366/336 |
| 5,552,038 | A * | 9/1996 | Muller et al. | 210/86 |
| 5,643,460 | A | 7/1997 | Marble et al. | |
| 6,652,757 | B2 * | 11/2003 | Hodges et al. | 210/709 |
| 6,805,803 | B1 * | 10/2004 | Weir et al. | 210/728 |
| 7,276,154 | B1 * | 10/2007 | Schaefer et al. | 210/96.1 |
| 7,338,617 | B2 * | 3/2008 | Koga et al. | 252/179 |
| 7,401,973 | B1 * | 7/2008 | Lott | 366/163.2 |

FOREIGN PATENT DOCUMENTS

| | | |
|---|---|---|
| JP | 2002028699 | 1/2002 |
| JP | 2002336872 | 11/2002 |
| JP | 2006175427 | 7/2006 |
| KR | 20040089469 | 10/2004 |

OTHER PUBLICATIONS

PCT Notification of Transmittal of the International Search Report and the Written Opinion of the International Seaching Authority, or the Declaration; PCT/US2007/074350; mailed Nov. 21, 2007; (11 pages).
Office Action issued in related Australian Application No. 2007281340 dated Feb. 5, 2010. (2 pages).

* cited by examiner

*Primary Examiner*—Peter A Hruskoci
(74) *Attorney, Agent, or Firm*—Osha • Liang LLP

(57) ABSTRACT

Systems and methods for dewatering drilling fluid including a feeder, an aging tank, a polyductor configured between the feeder and the aging tank and a flocculant solution pump fluidly connected to the aging tank. Further, the system includes a portable skid to house the feeder, the aging tank, the polyductor, and the flocculent solution pump. In certain embodiments, the polyductor is configured to mix a liquid with a dry flocculant from the feeder, and disperse a resultant flocculent solution in the aging tank, the aging tank is configured to receive the flocculant solution, and the flocculant solution pump is configured to remove the flocculant solution from the aging tank.

11 Claims, 3 Drawing Sheets

DEWATERING SYSTEM

FIELD

The present disclosure generally relates to dewatering systems used in the management of drilling fluid waste and drilling fluid volume reduction. More particularly, the present disclosure relates to dewatering systems incorporating dry and/or liquid flocculant sources. More particularly still, the present disclosure relates to automated and self-contained dry and/or liquid dewatering systems.

BACKGROUND

Generally, waste management dewatering systems separate solids and fine particles from the liquid phase of drilling fluid, thereby leaving a clarified aqueous solution. In a drilling operation, dewatering allows the cleaning of waste fluids, such as, drilling fluids mixed with water from the rotary table, mud tanks, mud pumps, generators and from any other discharge point around a drilling rig. Typically, dewatering waste management systems clean drilling fluid through coagulation, flocculation, and/or mechanical separation.

Coagulation occurs when the electrostatic charge on a solid is reduced, destabilizing the solid and allowing it to be attracted to other solids by van der Waals forces. Flocculation is the binding of individual solid particles into aggregates of multiple particles. Flocculation is physical, rather than electrical, and occurs when one segment of a flocculating polymer chain absorbs simultaneously onto more than one particle. Mechanical separation includes mechanical devices (e.g., hydrocyclones and centrifuges) that remove solid particles from a solution.

Traditionally, methods for removing solids from solutions in the dewatering of drilling fluid included the replication of the natural mud flocculation mechanisms using either calcium or chlorine based ion contamination. Lime and various chloride sources (e.g., $AlCl_3$) were used for flocculation. The solid aggregates could then be separated out by gravity filtration and/or a mechanical device, as described above. However, with the introduction of non-dispersed, inhibitive water-based drilling fluids (e.g., partially-hydrolyzed polyacrylamide and KCl), the clay particles within a mud system were already conditioned to resist ion contamination (i.e., resistant to flocculation and/or aggregation). Thus, the dewatering of water-base drilling fluids require multi-charge, high molecular weight polymers for flocculation.

Typically, polymers used for flocculation are manufactured in dry form and mixed by dewatering system operators into a solution prior to treating a mud system. Also, because the dry polymer is added to a liquid, an aging process is required to activate the dry polymers. Additionally, these polymers tend to be hygroscopic, and as such, have a limited shelf life. Thus, when housed in outdoor storage facilities, such as typically occurs in current commercial drilling operations, the hygroscopic polymers take on water, thereby decreasing their effective life. Also, the polymers in current commercial systems are typically exposed to wide temperature variations, further resulting in decreased effective life. Due to the need of polymer solution aging, batch mixing, and the limited shelf life in current commercial systems, management of dry flocculant dewatering systems is costly and resource dependent.

In response to the increased use of water-based drilling fluids, many companies now manufacture invert emulsion liquid flocculants and coagulants that provide increased activity and shelf life. However, due to their nanoemulsion formulation, these products require high energy for emulsion breaking and activation. Also, the liquid flocculants and coagulants still experience decreased shelf life when exposed to moisture and wide temperature variation. Thus, the liquid flocculants and coagulants do not always work effectively in current commercial systems.

Accordingly, there exists a need for a self-contained, climatized, and automated dewatering system.

SUMMARY

According to one aspect, embodiments disclosed herein relate to a system including a feeder, an aging tank, a polyductor configured between the feeder and the aging tank and a flocculent solution pump fluidly connected to the aging tank. Further, the system includes a portable skid to house the feeder, the aging tank, the polyductor, and the flocculant solution pump. In certain embodiments, the polyductor is configured to mix a liquid with a dry flocculant from the feeder, and disperse a resultant flocculent solution in the aging tank, the aging tank is configured to receive the flocculant solution, and the flocculant solution pump is configured to remove the flocculent solution from the aging tank.

In another aspect, embodiments disclosed herein relate to a system including a liquid flocculant supply tank, an aging tank, a dosing pump, a water booster pump, and a flocculant solution pump fluidly connected to the aging tank. Further, the system includes a portable skid to house the liquid flocculant supply tank, the aging tank, the dosing pump, the water booster pump, and the flocculent solution pump. In certain embodiments, the dosing pump is configured to disperse a liquid flocculant from the liquid flocculant supply tank into a line connecting the dosing pump, the aging tank, and the water booster pump, the water booster pump provides water to the line for mixing with the liquid flocculant to create a liquid flocculant solution, the liquid flocculant solution is aged in the aging tank, and the flocculant solution pump is configured to remove the liquid flocculent solution from the aging tank.

In another aspect, embodiments disclosed herein relate to a method to dewater drilling fluid including using a system having a feeder, an aging tank, a polyductor configured between the feeder and the aging tank and a flocculent solution pump fluidly connected to the aging tank. Further, the system includes a portable skid to house the feeder, the aging tank, the polyductor, and the flocculent solution pump. In certain embodiments, the polyductor is configured to mix a liquid with a dry flocculant from the feeder, and disperse a resultant flocculent solution in the aging tank, the aging tank is configured to receive the flocculent solution, and the flocculent solution pump is configured to remove the flocculant solution from the aging tank.

In another aspect, embodiments disclosed herein relate to a method to dewater drilling fluid including using a system having a liquid flocculent supply tank, an aging tank, a dosing pump, a water booster pump, and a flocculant solution pump fluidly connected to the aging tank. Further, the system includes a portable skid to house the liquid flocculant supply tank, the aging tank, the dosing pump, the water booster pump, and the flocculant solution pump. In certain embodiments, the dosing pump is configured to disperse a liquid flocculent from the liquid flocculent supply tank into a line connecting the dosing pump, the aging tank, and the water booster pump, the water booster pump provides water to the line for mixing with the liquid flocculant to create a liquid flocculent solution, the liquid flocculent solution is aged in the aging tank, and the flocculant solution pump is configured to remove the liquid flocculent solution from the aging tank.

Other aspects of the disclosure will be apparent from the following description and the appended claims.

DETAILED DESCRIPTION

Generally, embodiments disclosed herein relate to systems and methods for dewatering water-based drilling fluids thereby separating solids and other fine particles from a liquid phase, leaving a clarified aqueous product. More specifically, embodiments disclosed herein relate to a self-contained, modular-based dewatering system that may more efficiently dewater water-based drilling fluids at a drill site.

Typically, as used drilling fluids return from down hole, drill cuttings and other fine particulate matter may be suspended therein. Initially, the used drilling fluid may undergo any number of separation techniques (e.g., centrifugation, screening, mud cleaners, and shaking) to remove large drill cuttings from the fluid. While the aforementioned methods may remove large drill cuttings, other solids and fine particulate matter may remain suspended in the drilling fluid. To further remove particulate matter, as described above, coagulation and/or flocculation may be used.

Figure 1:
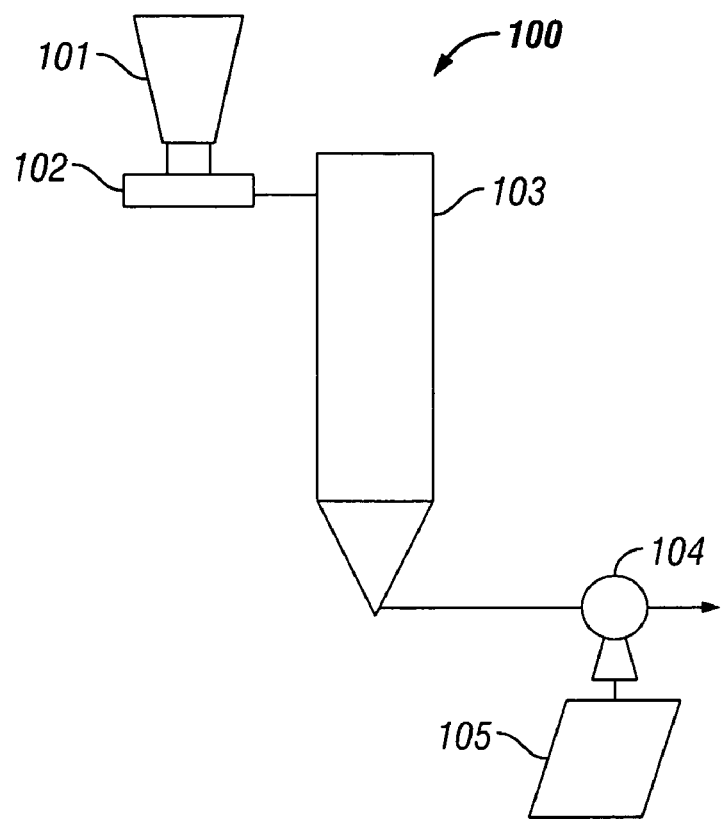
FIG. 1 is a schematic illustration of a dry flocculent dewatering system in accordance with an embodiment of the present disclosure.

Referring initially to FIG. 1, a modular dewatering system 100 in accordance with an embodiment of the present disclosure, is shown. In this embodiment, a feeder 101 is connected to a polyductor 102. Feeder 101 may include any device (e.g., a hopper with a screen and a rotating disc) capable of holding and dispensing a dry flocculation powder. Polyductor 102 may include a high efficiency eductor designed specifically for dry polymers. Generally, polyductor 102 may generate a high vacuum airflow to transport dry polymer flocculant from the rotating disc of feeder 101. In such a system, polyductor 102 may be connected to feeder 101 and may receive dry flocculant polymer therefrom. Polyductor 102 may also be fluidly connected to a water supply line.

In one embodiment, polyductor 102 may dilute the dry flocculent using water accelerated in a high efficiency nozzle. The high velocity water flow may generate a vacuum by entraining air as it exits the nozzle. The high speed collision in polyductor 102 between the polymer granules and the water stream may allow dispersion of the polymer granules. Thus, use of polyductor 102, as described above, may result in faster hydration and minimize the require aging time for polymer activation.

In one embodiment, as dry flocculant polymer enters polyductor 102, a water regulation valve (not shown) may control the flow of water into polyductor 102. In polyductor 102, the water mixes with the dry flocculent polymer, and the resultant solution may be dispersed into an aging tank 103. In aging tank 103, the flocculent polymer may age in accordance with the time requirements of the flocculant being used. After proper aging, the flocculent may be injected into a line containing used drilling fluid via a flocculent solution pump 104 (e.g., a polymer solution pump, a positive displacement pump, or a diaphragm pump).

Still referring to FIG. 1, the injection of the flocculant into the used drilling fluid is controlled by a programmable logic controller (PLC) 105. PLC 105 may regulate the dispersion of the flocculant into used drilling fluids by controlling flocculent solution pump 104, a positive displacement pump (not shown), and/or a diaphragm pump (not shown). In alternate embodiments, PLC 105 may also control other processes in the system, such as, for example, the dispersion of flocculant from polyductor 102 into aging tank 103.

Figure 2:
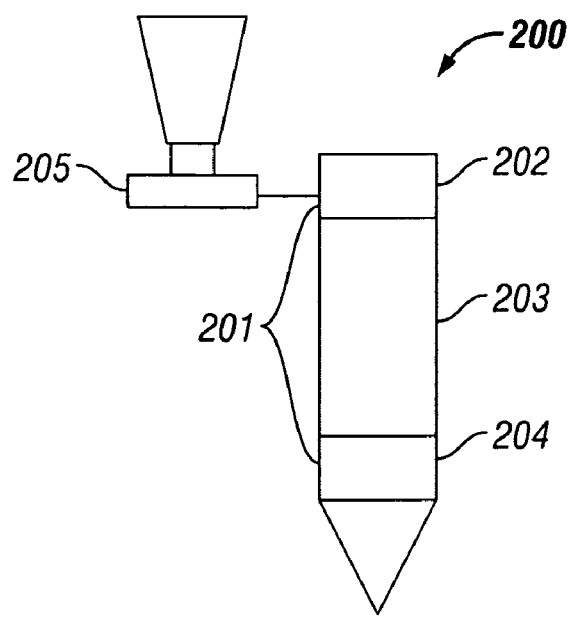
FIG. 2 is a process flow diagram of a dry flocculant dewatering system in accordance with an embodiment of the present disclosure.

In other embodiments, specialized components may be used in system 100 to further increase dewatering efficiency. Referring briefly to FIG. 2, a modular dewatering system 200 including a three-stage aging tank 201 is shown. In this embodiment, aging tank 201 is divided into three sections, including, a mixing section 202, an aging section 203, and a pumping section 204. As flocculant solution enters mixing section 202 from a polyductor 205, an agitation device (not shown) may further mix the flocculant solution. After a proper mixing time, as determined by the properties of the flocculent used, the contents of mixing section 202 may be transferred to aging section 203. Those having ordinary skill in the art will appreciate that suitable agitation times are known in the art. In aging section 203, a second agitation device (not shown) may further mix and/or stir the solution until the solution has reached its desired properties. The solution may then be transferred into a pumping section 204, which may serve as a holding portion until the solution is pumped into a line containing used drilling fluid.

Figure 3:
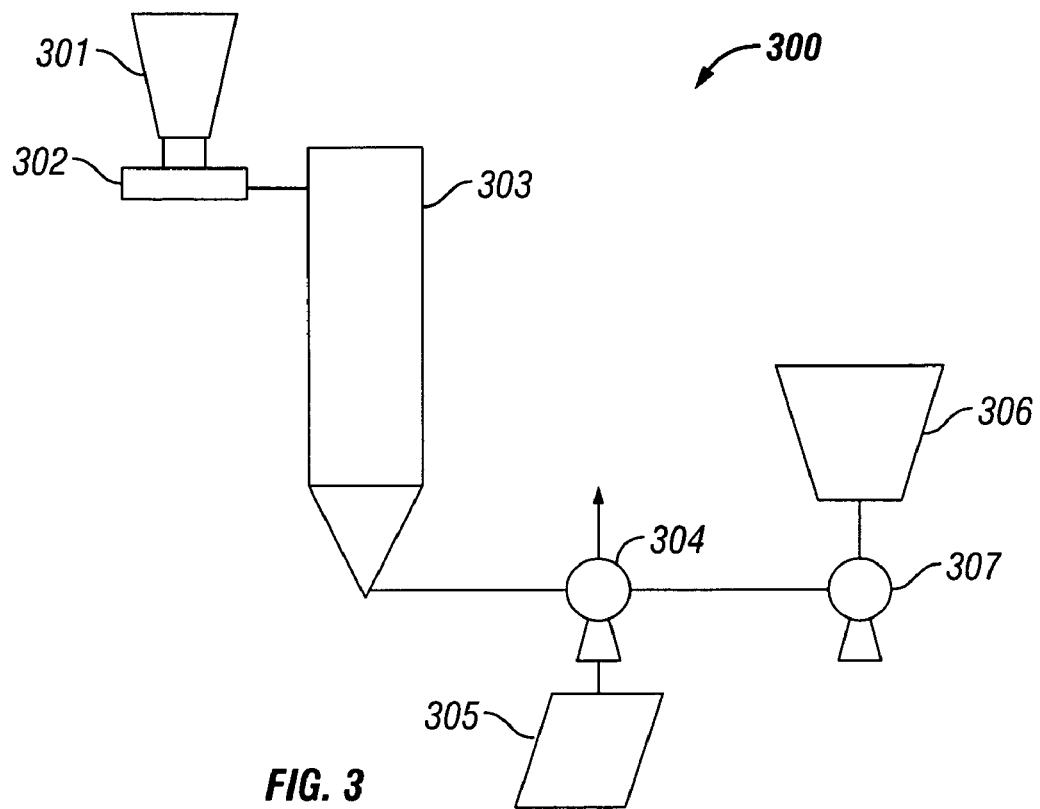
FIG. 3 is a schematic illustration of a dry flocculent and coagulant dewatering system in accordance with an embodiment of the present disclosure.

Referring now to FIG. 3, a modular dewatering system 300 in accordance with an embodiment of the present disclosure is shown. In this embodiment a dry flocculant feeder 301, a flocculant polyductor 302, a flocculant aging tank 303, and a solution pump 304 are connected, as described above. Additionally, a coagulant supply tank 306 may be connected to a water booster pump 307. Water booster pump 307 may allow the mixing of a liquid coagulant into a pressurized stream of water, thereby mixing a coagulant solution without the need of a separate aging/holding tank. In certain embodiments, water booster pump 307 may also be connected to a coagulant solution pump (not shown) for injection into a line containing used drilling fluid. As illustrated, solution pump 304 is configured to receive flocculant solution and coagulant solution and to inject the solutions into a line containing used drilling fluid.

In an alternate embodiment, as dry coagulant enters a polyductor, a water regulation valve may control the a flow of water into the polyductor. In the polyductor, the water mixes with the dry coagulant polymer, and the resultant solution may be dispersed into an aging tank. In the aging tank, the coagulant may age in accordance with the time requirements of the coagulant being used. After proper aging, the coagulant may be injected into a line containing used drilling fluid via a water booster pump. One of ordinary skill in the art will realize that after mixing, certain coagulants may not require aging. In such a system, the aging tank may serve as a holding tank for mixed coagulant solution, or the coagulant solution may be directly injected from a line fluidly connecting the polyductor and a water booster pump, as described above.

Still referring to FIG. 3, the injection of the flocculant and coagulant into the used drilling fluid is controlled by a programmable logic controller (PLC) 305. Similarly as to system 100, PLC 305 may control the dispersion rate of flocculant solution into a line containing used drilling fluid. Additionally, PLC 305 may control the dispersion rate of coagulant solution into the line containing used drilling fluid. In certain embodiments, PLC 305 may control the dispersion rate of the flocculant and coagulants through appropriate pumping means, as described above. Additionally, PLC 305 may control other aspects of system 300, including but not limited to, control of polyductors 302 and 307 and aging times of aging tanks 303 and 308.

Figure 4:
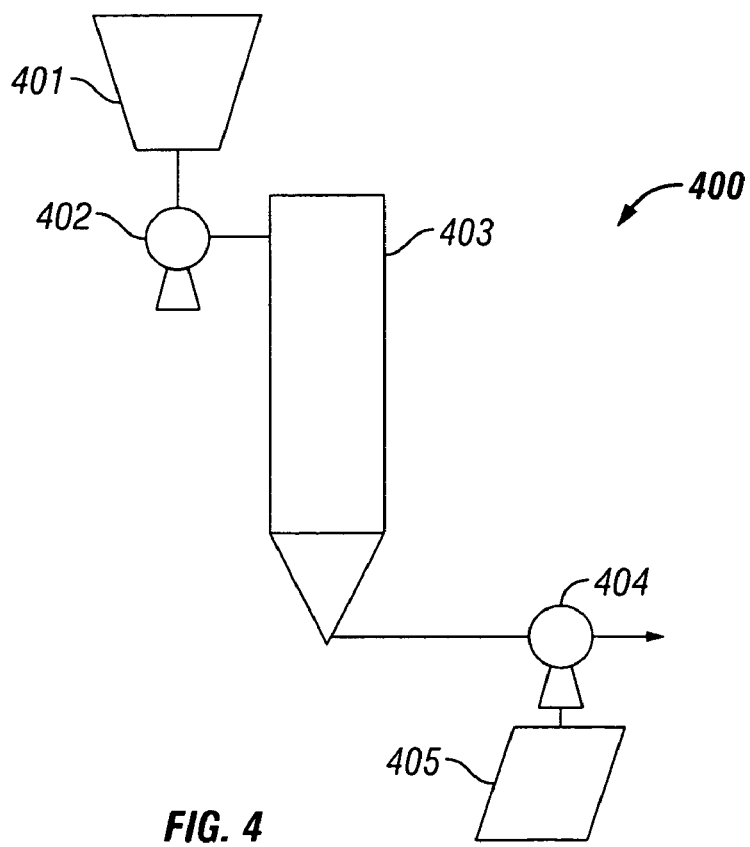
FIG. 4 is a schematic illustration of a liquid flocculant dewatering system in accordance with an embodiment of the present disclosure.

Referring now to FIG. 4, a liquid flocculant dewatering system 400 in accordance with an embodiment of the present disclosure, is shown. In this embodiment, a liquid flocculent supply tank 401 is connected to a dosing pump 402. Supply tank 401 may include any device capable of holding a liquid flocculant. Dosing pump 402 is connected to supply tank 401 and may receive liquid flocculent solution therefrom. Dosing pump 402 injects liquid flocculant into an aging tank 403 for proper aging in accordance with the recommended aging for the flocculant. In certain embodiments, aging tank 403 may be substantially smaller than aging tanks of dry polymer systems because liquid flocculants require shorter aging times. After proper aging, liquid flocculant is injected into used drilling fluid via a flocculent solution pump 404.

In alternate embodiments, system 400 may further include a water booster pump (not shown). In such an embodiment, liquid flocculent is injected from supply tank 401 into a line between dosing pump 402 and aging tank 403. Water provided by a water booster pump (not shown) mixes with the liquid flocculant, and may then enter aging tank 403 for aging. The above process is described relative to liquid flocculent, but one of ordinary skill in the art will realize that dosing any substance (e.g., flocculant or coagulant) into a transfer line for mixing with water from a water booster pump is within the scope of the present disclosure. Furthermore, in certain embodiments, a water booster pump may provide water to any number of flocculant and/or coagulant transfer lines for dilution during transference.

Still referring to FIG. 4, the injection of the flocculant into the used drilling fluid is controlled by a PLC 405. In this embodiment, PLC 405 may regulate the dispersion of the flocculant into used drilling fluids by controlling water booster pump 405. In alternate embodiments, PLC 405 may also control other processes in the system, such as, for example, the dispersion of flocculant from dosing pump 402 into aging tank 403.

Figure 5:
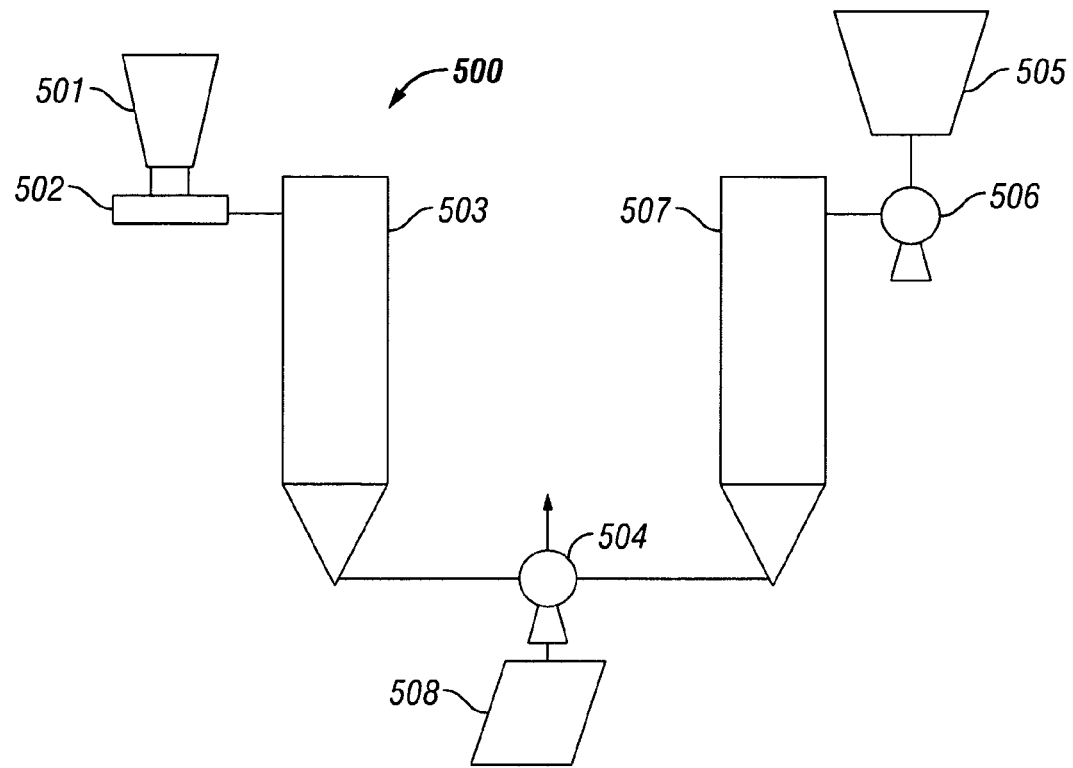
FIG. 5 is a schematic illustration of a dry flocculant and liquid flocculent dewatering system in accordance with an embodiment of the present disclosure.

Referring now to FIG. 5, a combination dry flocculent and liquid flocculant dewatering system 500 in accordance with an embodiment of the present disclosure, is shown. In this embodiment, a dry flocculent feeder 501, a flocculant polyductor 502, and a flocculant aging tank 503, are connected to a flocculant solution pump 504, as described above. Additionally, a liquid supply tank 505, a liquid flocculent dosing pump 506, and a liquid flocculent aging tank 507 are connected to flocculant solution pump 504, as described above. One of ordinary skill in the art will realize that alternate systems may include any number of additional solution pumps such that flocculant may be efficiently injected. One embodiment may include a water booster pump (not shown) to dilute the liquid flocculent prior to aging in aging tank 507. The operation of system 500, including the operation of at least flocculant solution pump 504 may be controlled through a PLC 508, as described above. Moreover, in certain systems, a separation device (e.g., a centrifuge) may be fluidly connected to flocculant solution pump 504 to remove flocs from the used drilling fluid. One of ordinary skill in the art will realize that in certain embodiments, the separation device may be included on a portable skid.

In this embodiment, flocculant solution pump 504 is configured to receive feed lines from both flocculent aging tank 503 and liquid flocculent aging tank 507. Flocculant solution pump 504 may then inject flocculant into a line containing used drilling fluid. Typically, both dry flocculant and liquid flocculant will not be used in a single run. However, by giving a drilling operator the choice or using either type of flocculent in one system, the operator may choose the most effective flocculating technique. Additionally, because alternate systems may include multiple pumps, the present system may provide the drilling operator the ability to switch seamlessly between types of flocculants. Thus, in a drilling operation wherein the drilling operator runs out of, for example, a dry powder flocculant, the drilling operator may easily switch to a liquid flocculent. Such a seamless transition between flocculants may prevent downtime that could otherwise increase the overall cost of drilling.

While not independently described, one of ordinary skill in the art will realize that alternate systems wherein any number of dry and/or liquid flocculating modules are used is within the scope of the present disclosure. Furthermore, any system within the scope of the present disclosure may be expanded to include coagulant modules, additional dry powder flocculent modules, and/or additional liquid flocculent modules. Thus, embodiments in accordance with the modular dewatering system of the present disclosure may allow a drilling operator any number of choices between flocculant and/or coagulant combinations when dewatering drilling fluid.

Figure 6:
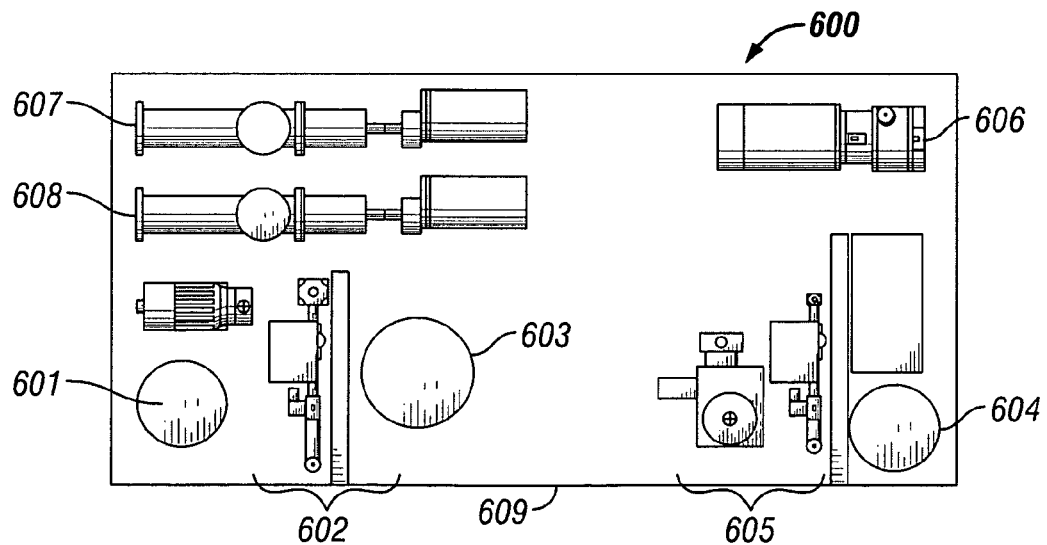
FIG. 6 is a top view layout of a skid based dewatering module in accordance with an embodiment of the present disclosure.

Referring now to FIG. 6, a top view layout of a skid based dewatering system 600 in accordance with an embodiment of the present disclosure, is shown. In this embodiment, dewatering system 600 includes a dry flocculent supply tank 601, a dry flocculent feed system (e.g., the feeder and polyductor of system 100) 602, and a dry flocculant aging tank 603. Additionally, system 600 includes a coagulant supply tank 604, a coagulant feed system 605, and a water booster pump 606. In this embodiment, there is not a coagulant aging tank because the liquid coagulant may be directly injected and mixed with water from water booster pump 606. As flocculant and coagulant solution are ready for injection into a line containing used drilling fluid, flocculent and coagulant solution may be injected through flocculant solution pump 607 and coagulant solution pump 608 respectively.

In this embodiment, system 600 includes a portable skid 609 onto which all of the above listed components are connected. Thus, system 600 is self contained on a single modular skid incorporating all of the necessary components of a dewatering system. Such a portable skid may be transported between drilling operations thereby reducing the capital expenditure costs of a drilling operation. Additionally, system 600 provides that supply tanks 601 and 604 are on skid 609. In certain embodiments, skid 609 may be enclosed in a housing (not shown). In such a system, the dry/liquid flocculants and coagulants may be stored in a climatized environment, regulated by an environmental regulation unit (e.g., an air conditioner, a moisture control device, or housing structure). Because the temperature of the flocculants and coagulants may be regulated, their effective lives may be extended. Additionally, because the flocculants and coagulants may be stored inside, they will have less exposure to the sun and/or moisture (i.e., precipitation) that may further shorten their effective lives.

EXAMPLES

The following examples were used to test the presently disclosed dewatering systems and methods.

The first field trial was on a directional well programmed to be drilled to 12,500 feet with casing strings at 400 feet and 2,500 feet. The dewatering system included a stand alone liquid flocculent and coagulant system fluidly connected to a first centrifuge for barite recovery and a second centrifuge for dewatering. The liquid polymer skid was a self-contained, climatized unit, incorporating flocculent and coagulant mixing/injection systems. The system was also equipped with a water booster pump that maintained 30 psi through the water line for proper mixing/injection of the chemicals. Additionally, the system included a 20 gallon flocculant aging tank. The coagulant was mixed and injected in-line. For the upper interval of the well, only the flocculent (CYTEC's SUPER-FLOC® SD 2081) was required. For the second interval with increased mud weight and salinity, addition of coagulant (CYTEC's SUPERFLOC® 607) was required. The table below provides field results illustrating the adjustability of mud flowrate, polymer dilation, and polymer concentration manipulation in a liquid polymer unit in accordance with an embodiment of the present disclosure.

TABLE 1

Dewatering Field Results - Liquid Polymer Unit

| Time | Centrifuge Speed [rpm] | Mud Flowrate [gpm] | Polymer | Polymer Dilution [%] | Polymer Concentration [ppm] |
|---|---|---|---|---|---|
| 8:20 | 1900 | 50 | 0 | 0 | 0 |
| 8:30 | 1900 | 50 | 0 | 0 | 0 |
| 9:10 | 1900 | 50 | SD 2081 | .2 | 100 |
| 10:10 | 1900 | 50 | SD 2081 | .2 | 100 |
| 10:15 | 1900 | 50 | SD 2081 | .2 | 150 |
| 10:34 | 1900 | 50 | SD 2081 | .2 | 150 |
| 10:40 | 1900 | 50 | SD 2081 | .2 | 200 |
| 10:55 | 1900 | 50 | SD 2081 | .2 | 200 |
| 10:56 | 1900 | 50 | SD 2081 | .2 | 250 |
| 11:20 | 1900 | 50 | SD 2081 | .2 | 250 |
| 11:22 | 1900 | 50 | SD 2081 | .2 | 300 |
| 11:40 | 1900 | 50 | SD 2081 | .2 | 300 |
| 11:45 | 1900 | 40 | SD 2081 | .2 | 150 |
| 12:00 | 1900 | 40 | SD 2081 | .2 | 150 |
| 12:05 | 1900 | 40 | SD 2081 | .2 | 200 |
| 12:20 | 1900 | 40 | SD 2081 | .2 | 200 |
| 12:25 | 1900 | 40 | SD 2081 | .2 | 100 |
| 12:40 | 1900 | 40 | SD 2081 | .2 | 100 |
| 12:45 | 1900 | 50 | SD 2081 | .2 | 100 |
| 13:00 | 1900 | 50 | SD 2081 | .2 | 100 |
| 13:05 | 1900 | 60 | SD 2081 | .2 | 250 |
| 13:15 | 1900 | 60 | SD 2081 | .2 | 250 |
| 13:30 | 1900 | 50 | SD 2081 | .33 | 100 |

The above table illustrates the adjustability of flocculant polymer concentration in parts per million (ppm) in a liquid flocculent dewatering system. Additionally, table illustrates the centrifuge speed in rotations per minute (rpm) and the mud flowrate in gallons per minute (gpm). In the first field trial, polymer concentration was incrementally adjusted from 0 ppm to 300 ppm while maintaining a constant mud flowrate of 50 gpm. Subsequently, the mud flowrate was varied between 40 grm and 60 gpm The feed mud had a specific gravity of 1.2 and an out-of measurable range nephelometric turbidity (NTU) of greater than 1,200. Treating the mud with 150 ppm flocculent generated a centrifuge effluent with 1.08 specific gravity and 762 NTU. As higher dosages of flocculant were used, better turbidity measurements were obtained.

The adjustability of the system allowed the operator to adjust the mud flowrate such that as polymer concentration was decreased the flow rate could also be decreased. In such a system, as the mud flowrate is decreased the flocculant laden mud may remain in the centrifuge longer. Thus, one of ordinary skill in the art will realize that by adjusting the mud flowrate, the polymer concentration, and/or the polymer dilution, a system operator may adjust a dewatering system to process the mud of a given operation with the greatest efficiency.

The second field trial was on a well programmed to be drilled to 9,500 feet with casing strings set at 400 feet and 1,700 feet. The dewatering system included a stand alone dry flocculant system fluidly connected to a single centrifuge for dewatering. The dry polymer skid was a self-contained, climatized unit, incorporating a feeder, a polyductor and a 3-compartment aging tank. The polymer solution mixing was controlled by a PLC system. The dry flocculant used in the system was CIBA's MAGNAFLOC® 351. The table below provides field results illustrating the adjustability of mud flowrate and polymer concentration manipulation in a dry polymer unit in accordance with an embodiment of the present disclosure.

TABLE 2

Dewatering Field Results - Dry Polymer Unit

| Time | Mud Flowrate [gpm] | Polymer | Polymer Concentration [ppm] |
|---|---|---|---|
| 9:00 | 50 | 0 | 0 |
| 11:55 | 50 | 0 | 0 |
| 12:00 | 50 | Magnafloc 351 | 100 |
| 12:25 | 50 | Magnafloc 351 | 100 |
| 12:40 | 50 | Magnafloc 351 | 70 |
| 12:50 | 50 | Magnafloc 351 | 70 |
| 12:55 | 50 | Magnafloc 351 | 150 |
| 13:10 | 50 | Magnafloc 351 | 150 |
| 13:15 | 50 | Magnafloc 351 | 200 |
| 13:40 | 50 | Magnafloc 351 | 200 |
| 13:45 | 50 | Magnafloc 351 | 100 |

In the second field trial, the polymer concentration was adjusted between 0 and 200 ppm while the mud flowrate was kept constant at 50 gpm. The feed mud had a specific gravity of 1.26 and an out of measurable range NTU. The effluent of the centrifuge after treatment had a specific gravity of 1.06 with 326 NTU. Better turbidity measurements were obtained using higher polymer dosages (as low as 123 NTU at 250 ppm polymer).

Similarly as occurred in the first trial, the adjustability of the system allowed the dewatering system operator to adjust the polymer concentration to provide the most efficient dewatering. As such, one of ordinary skill in the art will realize that the automated system of the present disclosure may allow an operator to adjust variables of the system to dewater mud to specified conditions.

Advantageously, embodiments of the aforementioned systems and methods may increase the operating efficiency of water-based drilling fluid dewatering. Because the systems described above may include separate modules to handle dry/liquid flocculants and coagulants, rig downtime that may be experienced during flocculant or coagulant type adjustment may be minimized. Further, because the system may be fully automated through the use of a programmable logic controller, the polymer mixing may be more precise, thus increasing flocculant and coagulant consistency while potentially reducing polymer consumption. Moreover, because a drilling operator no longer has to mix the individual polymers, the operator has more time to attended to other portions of the drilling operation. Furthermore, because the product flocculent and coagulant solutions may be more strictly conditioned, there may occur increased solid separation at higher centrifuge feed rates. The reduction of polymer usage, more efficient use of human labor, and increased solid separation may all contribute to considerable cost reduction in a drilling operation.

Also, because systems in accordance with embodiments of the present disclosure may be mounted on a portable skid, the cost savings and efficiency of the system may be further increased. Specifically, because polymers may be stored in close proximity to the dewatering operation in climatized housing, damage to the effective lives of the polymers may be prevented. By minimizing damage to the polymers by sun and premature water exposure, less polymer may be wasted, thereby further decreasing the costs of dewatering. Finally, the mounting of the system on a portable skid allows the dewatering system to be both self-contained and portable. Such a system may be used as a component in a solids management system, and through standardization of components, further decrease the cost of the drilling operation.

While the invention has been described with respect to a limited number of embodiments, those skilled in the art, having benefit of the present disclosure, will appreciate that other embodiments may be devised which do not depart from the scope of the disclosure described herein. Accordingly, the scope of the disclosure should be limited only by the claims amended hereto.

What is claimed is:

1. A dewatering system comprising:
   a feeder comprising a hopper with a screen and a rotating disc;
   an aging tank;
   a polyductor having a nozzle configured between the feeder and the aging tank;
   a flocculant solution pump fluidly connected to the aging tank; and
   a portable skid to house the feeder, the aging tank, the polyductor, and the flocculant solution pump;
   wherein the feeder is configured to dispense a dry flocculant from the hopper, through the screen, and onto the rotating disc;
   wherein the polyductor is configured to mix a liquid with the dry flocculant from the rotating disc with the nozzle, and disperse a resultant flocculant solution in the aging tank;
   wherein the aging tank is configured to receive the flocculant solution; and
   wherein the flocculant solution pump is configured to remove the flocculant solution from the aging tank to a separation device for dewatering waste fluids.

2. The dewatering system of claim 1, further comprising:
   a coagulant supply tank;
   a water booster pump; and
   a coagulant solution pump fluidly connected to the coagulant supply tank and the water booster pump.

3. The dewatering system of claim 1, further comprising a flocculant supply tank configured to attach to the feeder.

4. The dewatering system of claim 1, further comprising a programmable logic controller to regulate at least the removal of the flocculant solution from the aging tank.

5. The dewatering system of claim 1, wherein the flocculant solution pump is fluidly connected to a separation device.

6. The dewatering system of claim 5, wherein the separation device is a centrifuge.

7. The dewatering system of claim 1, further comprising an environmental regulation unit.

8. The dewatering system of claim 7, wherein the environmental regulation unit is an air conditioner.

9. The dewatering system of claim 1, further comprising:
   a liquid flocculant supply tank to store liquid flocculant;
   a dosing pump to regulate the dispersal of liquid flocculant into the aging tank; and
   a liquid aging tank to age the liquid flocculant;
   wherein the liquid flocculant is removed from the liquid aging tank by the flocculant solution pump.

10. The dewatering system of claim 9, wherein the liquid flocculant is removed from the liquid aging tank by a second flocculant solution pump.

11. The dewatering system of claim 1, wherein the portable skid further comprises a housing to enclose the dewatering system.

* * * * *